Patented Nov. 30, 1948

2,455,241

UNITED STATES PATENT OFFICE 2,455,241

MANUFACTURE OF ETHYLHEXOIC ACID

Bruce Duval and Karl Heinrich Walter Tuerck, Banstead, England, assignors to The Distillers Company, Limited, Edinburgh, Scotland, a company of Great Britain No Drawing. Application October 23, 1946, Serial No. 705,234. In Great Britain October 26, 1945

3 Claims. (Cl. 260—530)

This invention is for improvements in or relating to the manufacture of alpha-ethyl-hexoic acid.

The esters of alpha-ethylhexoic acid have been found to be of considerable utility as solvents and plasticisers particularly for polyvinyl chloride. We have found, however, that alpha-ethylhexoic acid prepared by the oxidation of liquid alpha-ethyl-hexaldehyde obtained by the hydrogenation of alpha-ethyl-beta-propylacrolein with molecular oxygen is intensely coloured, which, of course, limits its use as starting material for the manufacture of plasticisers.

We have now discovered that this discoloration of the reaction product is due to the presence of heptan-3.4-dione, which, even in great dilution, gives rise to an intense yellow-green colour. We have further found, that the presence of the di-ketone in the reaction mixture is due to the fact that some unchanged alpha-ethyl beta-propyl-acrolein remains in the reaction product at the conclusion of the hydrogenation reaction and that this unchanged aldehyde becomes oxidised to the diketone under the conditions used for the oxidation of ethylhexaldehyde.

In our copending application Serial No. 705,233, filed October 23, 1946, now United States Patent No. 2,444,399, we have described a process for producing substantially colourless alpha-ethyl hexoic acid which comprises hydrogenating alpha-ethyl beta-propyl acrolein to produce a reaction product consisting mainly of alpha-ethyl-hexaldehyde together with substantial amounts of alphaethyl hexanol and subjecting this reaction product, in the liquid phase to oxidation with molecular oxygen. That process removes the alpha-ethyl beta-propyl acrolein substantially completely from the reaction mixture prior to the oxidation stage.

According to the present invention there is provided a process for the manufacture of permanently colourless alpha-ethyl hexoic acid which comprises treating a mixture of alpha-ethyl hexaldehyde and alpha-ethyl-beta-propyl acrolein, resulting from the partial hydrogenation of alpha-ethyl-beta-propyl acrolein, with molecular oxygen, separating, by fractional distillation from the reaction mixture, an alpha-ethyl hexoic acid fraction substantially free from alpha-ethyl-beta-propyl acrolein and alpha-ethyl-beta-propyl acrylic acid but containing traces of heptan-3-4-dione and removing said diketone from said fraction. The removal of the diketone may be effected by the action of oxygen, preferably accelerated by means of ultra-violet radiation, or by the action of hydrogen peroxide. The oxidation step oxidises the diketone and consequently destroys the colouration in the said fraction and a substantially colourless alpha-ethyl hexoic acid can be obtained. The removal of the diketone can also be achieved by means of reagents, such as semicarbazide, phenylhydrazine or sodium bisulphite, which react with the keto-group or groups thereof.

The removal of the unsaturated material, primarily the alpha-ethyl-beta-propyl acrylic acid, from the reaction mixture may be achieved by carefully fractionating the crude acid reaction mixture or a fraction distilled therefrom so that a fraction boiling within a range of about 5° C. is obtained which fraction is used for the subsequent purification step.

We have further found that a coloured alpha-ethylhexoic acid, if substantially free from unsaturation, can be rapidly decolourised by subjecting it to actinic light, e. g. sunlight, in the presence of oxygen. However, it is important that the acid is free from any substantial amount of high-boiling unsaturated compounds particularly alpha-ethyl-beta-propyl acrylic acid as, otherwise, this substance on standing in the presence of oxygen and/or sunlight is slowly converted into heptan-3-4-dione with a return of the yellow colour.

The following example illustrates the manner in which the invention may be carried into effect, the percentage figures quoted being calculated by weight.

*Example.*—An alpha-ethylhexaldehyde fraction boiling at 162°–164° C./760 mm. Hg, obtained from a liquid phase hydrogenation of alpha-ethyl beta-propyl acrolein with Raney nickel at 50° C. which had been interrupted whilst 14% of the alpha-ethyl beta-propyl-acrolein still remained unchanged, and containing 1.7% alpha-ethyl-beta-propyl acrolein was oxidised with molecular oxygen. The alpha-ethylhexoic acid which, on fractionation of the reaction product came over at 124° C./12 mm., was strongly coloured. The acid fraction contained 1.7% of alpha-ethyl-beta-propyl acrylic acid. After careful refractionation, whereby the higher-boiling unsaturated compounds were removed, a permanently colourless acid was obtained by the addition of small amounts of hydrogen peroxide.

What we claim is:

1. A process for the manufacture of permanently colourless alpha-ethyl-hexoic acid which comprises partially hydrogenating alpha-ethyl-beta-propyl-acrolein to produce a mixture of alpha-ethyl hexaldehyde and unchanged alpha-ethyl-beta-propyl-acrolein, and treating said mixture with molecular oxygen, characterized in the steps of separating, by fractional distillation from the reaction mixture, an alpha-ethyl hexoic acid fraction free from both alpha-ethyl-beta-propyl acrolein and alpha-ethyl-beta-propyl acrylic acid but containing traces of heptan-3-4-dione and removing said diketone from said fraction.

2. A process for the manufacture of permanently colourless alpha-ethyl-hexoic acid which comprises partially hydrogenating alpha-ethyl-beta-propyl-acrolein to produce a mixture of alpha-ethyl hexaldehyde and unchanged alpha-ethyl-beta-propyl-acrolein, and treating said mixture with molecular oxygen, characterized in the steps of separating, by fractional distillation from the reaction mixture, an alpha-ethyl hexoic acid fraction free from both alpha-ethyl-beta-propyl acrolein and alpha-ethyl-beta-propyl acrylic acid but containing traces of heptan 3-4-dione and removing said diketone from said fraction by the action of oxygen.

3. A process for the manufacture of permanently colourless alpha-ethyl-hexoic acid which comprises partially hydrogenating alpha-ethyl-beta-propyl-acrolein to produce a mixture of alpha-ethyl hexaldehyde and unchanged alpha-ethyl-beta-propyl-acrolein, treating said mixture with molecular oxygen, separating, by fractional distillation from the reaction mixture, an alpha-ethyl hexoic acid fraction substantially free from both alpha-ethyl-beta-propyl acrolein and alpha-ethyl-beta-propyl acrylic acid but containing traces of heptan-3-4-dione and removing said diketone from said fraction by treating the reaction mixture with hydrogen peroxide.

BRUCE DUVAL.
KARL HEINRICH WALTER TUERCK.

REFERENCES CITED

The following references are of record in the file of this patent:

UNITED STATES PATENTS

| Number | Name | Date |
|---|---|---|
| 2,060,267 | Toussaint | Nov. 10, 1936 |
| 2,062,904 | Hartman | Dec. 1, 1936 |
| 2,115,892 | Toussaint | May 3, 1938 |
| 2,150,158 | Gallagher et al. | Mar. 14, 1939 |
| 2,255,421 | Groll | Sept. 9, 1941 |

OTHER REFERENCES

Bouveault et al., Bulletin de la Societe Chemique de Paris (3), vol. 27, 1902.